(12) United States Patent
Müller et al.

(10) Patent No.: US 6,672,155 B2
(45) Date of Patent: Jan. 6, 2004

(54) APPARATUS FOR DETERMINING THE FILLING LEVEL OF A FILLING MATERIAL IN A CONTAINER

(75) Inventors: Roland Müller, Steinen (DE); Winfried Maier, Maulburg (DE); Wolfgang Lubcke, Steinen (DE); Thomas Malzahn, Rheine (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/975,083

(22) Filed: Oct. 12, 2001

(65) Prior Publication Data

US 2002/0059828 A1 May 23, 2002

Related U.S. Application Data

(60) Provisional application No. 60/264,033, filed on Jan. 26, 2001.

(30) Foreign Application Priority Data

Oct. 14, 2000 (DE) .......................................... 100 51 025

(51) Int. Cl.$^7$ ............................................... G01F 23/00
(52) U.S. Cl. ................................... 73/290 V; 342/124
(58) Field of Search ........................ 73/290 V; 342/124

(56) References Cited

U.S. PATENT DOCUMENTS

| | | | | |
|---|---|---|---|---|
| 1,956,920 A | * | 5/1934 | Haltmeier | ................ 73/290 V |
| 4,336,719 A | * | 6/1982 | Lynnworth | ............... 73/861.27 |
| 4,580,449 A | * | 4/1986 | Hatono et al. | .............. 324/644 |
| 4,589,281 A | * | 5/1986 | Aldrich | .................... 73/290 R |
| 4,972,386 A | * | 11/1990 | Lau | ............................. 342/124 |
| 5,365,178 A | * | 11/1994 | Van Der Pol | ............... 324/644 |
| 5,611,239 A | | 3/1997 | Klinshteyn | |
| 5,799,534 A | * | 9/1998 | van der Pol | .............. 73/290 V |
| 5,948,979 A | * | 9/1999 | Fitsch et al. | .............. 73/290 V |
| 6,047,598 A | * | 4/2000 | Otto et al. | ................... 340/621 |

FOREIGN PATENT DOCUMENTS

| | | |
|---|---|---|
| DE | 2452555 A1 | 5/1975 |
| DE | 2827032 A1 | 8/1979 |

* cited by examiner

*Primary Examiner*—Hezron Williams
*Assistant Examiner*—Katina Wilson
(74) *Attorney, Agent, or Firm*—Jones, Tullar & Cooper, P.C.

(57) ABSTRACT

The invention relates to an apparatus for determining the filling level of a filling material in a container having a signal production unit which produces measurement signals, having at least one antenna which transmits the measurement signals in the direction of the surface of the filling material and which receives the measurement signals reflected on the surface of the filling material, and having a control/evaluation unit which uses the delay time of the measurement signals to determine the filling level of the filling material in the container. The apparatus allows a filling level measurement device, which operates on the delay-time principle, to be mounted on a container in a cost-effective and simple manner. An opening is provided in the upper region of one sidewall of the container, and in that the at least one antenna is positioned in this opening with the antenna being arranged and configured such that the measurement signals are emitted essentially in the direction of the surface of the filling material and such that the measurement signals reflected on the surface of the filling material are received by the at least one antenna.

22 Claims, 10 Drawing Sheets

APPARATUS FOR DETERMINING THE FILLING LEVEL OF A FILLING MATERIAL IN A CONTAINER

This application is based on Provisional Application filed Jan. 26, 2001 as application No. 60/264,033.

FIELD OF THE INVENTION

The invention relates to an apparatus for determining the filling level of a filling material in a container having a signal production unit which produces measurement signals, having at least one antenna which transmits the measurement signals in the direction of the surface of the filling material and which receives the measurement signals reflected on the surface of the filling material, and having a control/evaluation unit which uses the delay time of the measurement signals to determine the filling level of the filling material in the container. The measurement signals are preferably ultrasound signals or microwave signals.

BACKGROUND DISCUSSION

Delay time methods make use of the physical law according to which the propagation distance is equal to the product of the delay time and the rate of propagation. In the case of filling level measurement, the propagation distance corresponds to twice the distance between the antenna and the surface of the filing material. The useful echo signal, that is to say the signal reflected on the surface of the filling material, and its delay time are determined using the so-called echo function and the digitized envelope curve, in which case the envelope curve models the amplitudes of the echo signals as a function of the distance "antenna—surface of the filling material". The filling level is then itself obtained from the difference between the known distance between the antenna and the base of the container and the distance between the surface of the filling material and the antenna, as determined by the measurement.

All known methods can be sued which allow relatively short distances to be determined by means of reflected measurement signals. If the measurement signals are microwaves, then both pulsed radar and frequency-modulated continuous wave radar (FMCW radar) can be used. Microwave measurement devices which use pulsed radar are marketed by the applicant, for example under the name "MICROPILOT". An equipment type which operates with ultrasound signals is available from the applicant, for example, under the name "PROSONIC".

In both the known ultrasound measurement devices and in microwave measurement devices, the antennas via which the measurement signals are transmitted in the direction of the surface of the filling material, and via which the measurement signals reflected on the surface of the filling material are received must be located in the region of the lid of the container. This arrangement is necessary in order that the measurement signals strike the surface of the filling material essentially at right angles. One antenna is preferably positioned in a connecting stub which is already present in the lid of the container. In situations in which there is no opening, the opening must be provided specifically for fitting the antenna. In the simplest case, the measurement apparatus is mounted in the connecting stub opening in the lid via a flange. Installation and maintenance of a measurement device in the lid region of a container has been found to be tedious and difficult, particularly when no opening is provided there and an opening must be produced in advance. The installation and maintenance of the measurement device in containers having large geometric dimensions—that is to say the situation which is normal in industrial process technology and instrumentation—are particularly problematic.

However, in many cases, there are also openings in the sidewall of the container in which the filling material is stored. These openings may be used, for example, to accommodate a so-called bypass, that is to say a piece of pipe, which is arranged parallel to the outer wall of the container. However, they may also be provided in order to fit a differential pressure sensor. For both variants, an opening must be provided in each case both in the lower region and in the upper region of the sidewall of the container. Furthermore, the already existing opening in the sidewall may be a retaining opening for a pressure or temperature sensor, or for a limit switch for determining and/or monitoring the maximum filling level of a filling material in the container. Whatever the original purpose of this opening, if it is located in the upper region of the sidewall of the container, then it can be used in conjunction with the apparatus according to the invention.

SUMMARY OF THE INVENTION

The invention is based on the object of proposing an apparatus which allows a filling level measurement device, which operates on the delay-time principle, to be mounted on a container in a cost-effective and simple manner.

The object is achieved in that an opening is provided in the upper region of one sidewall of the container, and in that the at least one antenna is positioned in this opening with the antenna being arranged and configured such that the measurement signals are emitted essentially in the direction of the filling material and such that the measurement signals reflected on the surface of the filling material are received by the antenna. The transmission unit and the reception unit can, of course, also be designed as separate units, in which case it is entirely possible to arrange both antennas in an apparatus which is designed as an integral unit.

As has already been mentioned above, openings in the upper region of the sidewall of the container are, on the one hand, preferably used for installation of the filling level measurement device where, on the other hand, the openings already exist there. Both measures allow the installation and maintenance of the filling level measurement device to be considerably simplified, of course. In many cases, the customer would also like to replace the existing differential pressure instrumentation by instrumentation which operates using electromagnetic measurement signals.

The replacement of a differential-pressure sensor by a measurement device which operates with freely transmitted measurement signals at the same time offers further advantages:

Reduction in the installation complexity: in principle, two variables have to be detected for differential-pressure measurement, namely the static pressure of a liquid and, for example, the pressure of a gas cushion. At least two openings must be provided in the outer wall of the container in order to detect the two variables. Furthermore, a pipeline is required to connect the two measurement points. Such pipelines result in a risk of blockage, particularly when measuring the pressure in viscous liquid filling materials.

Risk of the filling material flowing out: openings in the lower region of the container always represent a risk, of course, particularly when toxic filling materials are being stored in the container.

Labor cost for maintenance and replacement of a differential-pressure sensor: in order to replace a device which is arranged in the lower region of the container, it is in principle necessary to empty the container in advance.

As already stated, in the context of the apparatus according to the invention, it is possible in a very simple manner to replace a differential-pressure sensor mounted in the sidewall of the container by a microwave or ultrasound sensor.

According to one advantageous development of the apparatus according to the invention, the antenna is essentially an elongated element, whose external dimensions in the longitudinal direction are greater, and in the transverse direction are less, than the internal dimensions of the opening. This configuration makes it possible to fit the antenna from the outside through the sidewall into the interior of the container, and to adjust it such that the measurement signals are emitted essentially in the direction of the surface of the filling material. The antenna is most easily adjusted by appropriate rotation of the elongated element about the longitudinal axis. The antenna may be, for example, a leaky waveguide, a ridge waveguide or a Yagi antenna. It is also possible to configure the antenna as a horn radiating element with a symmetrical or asymmetric horn, and with the horn preferably being integrated in the elongated element.

Alternatively, a separate rod antenna or a separate horn antenna may also be provided as the antenna. The rod antenna or the horn antenna is then preferably arranged such that it can be folded in the region of the end face of the elongated element. In order to allow the antenna to be fitted into the interior of the container through the opening in the container wall, the rod or horn antenna is oriented in the direction of the longitudinal axis of the elongated element, with the antenna in this position being dimensioned such that it can be pushed through the opening from the outside. If the elongated element and, in particular the antenna are arranged in the interior of the container, the rod or horn antenna is pivoted through 90°, so that it can now transmit the measurement signals in the direction of the surface of the filling material, and can receive the measurement signals reflected on the surface.

One advantageous embodiment provides an additional sensor, which determines at least one process variable in the container. This additional sensor is connected to the antenna, which determines the filling level on the basis of the delay time of measurement signals. The additional sensor is preferably mounted in the direction of the longitudinal axis of the antenna. The additional sensor may be, for example, a vibration detector, that is to say a limit switch for determining and/or monitoring the filling level in the container, a pressure sensor or a temperature sensor. One advantageous development of the apparatus according to the invention proposes that two antennas be arranged in or on the elongated element, which transmit measurement signals at different frequencies in the direction of the surface of the filling material, and which receive the measurement signals reflected on the surface of the filling material. Furthermore—as already described at a previous point—the invention provides for two antennas to be arranged in and/or on the elongated element, with the one antenna being used as a transmission unit and the other being used as a reception unit for measurement signals at a predetermined frequency. In the latter case, this is thus a filling level sensor with a separate transmission and reception unit.

One particularly advantageous development of the apparatus according to the invention proposes that at least the additional sensor be a sensor which complies with a specified safety standard. The following safety standards may, for example, be satisfied by the sensor: German Water Budget Act, Order on Combustible Liquids, Safety Integrity Level (SIL). The advantage of such an apparatus for the user is that lower insurance premiums are incurred when using a sensor which complies with at least one safety standard, and this can considerably reduce the operating costs.

One advantageous development of the apparatus according to the invention provides for a metallic shield to be located in the antenna region which is arranged in the opening in the sidewall of the container, or for a metallic shield to be located in an antenna region which is arranged in the immediate vicinity of the opening in the sidewall of the container. This refinement makes it possible to effectively eliminate interference signals which are caused by reflections in the opening in the container wall (the so-called connecting stub ringing), on the container wall or on adjacent fittings in the interior of the container. The shield may, for example, be a metal sleeve.

In order to protect the antenna and/or the sensor of the apparatus according to the invention against the influence of a corrosive filling material, one refinement of the apparatus according to the invention proposes that the additional sensor and/or the antennas be provided with a protection layer, in particular with a dielectric protection layer, at least in the region which projects into the interior of the container. This refinement is a major advantage, particularly if the antennas and/or the additional sensor come/comes into direct contact with the filling material. Protection layers which may be used in conjunction with the present invention are already known, for example from EP 0 669 673 B1.

In order to simplify maintenance and installation, one advantageous embodiment of the apparatus according to the invention provides an outer housing which is mounted in the opening in the upper region of the sidewall of the container and provides that the antenna, or the antenna with the additional sensor, be positioned in the outer housing. The outer housing is firmly connected to the container, for example via a flange. The outer housing is preferably composed of a dielectric material. However, it is also possible to manufacture the outer housing from a conductive material, winch has a cutout on the side facing the filling material. An insert composed of a dielectric material is provided in this cutout, which acts as an outlet or an inlet opening for the measurement signals.

In order to ensure optimum transmission and optimum reception of the measurement signals, the antenna is arranged in the outer housing such that it can rotate or can pivot about its longitudinal axis. It can thus be adjusted with respect to the cutout described above, without any problems. Adjustment is necessary, in particular, if the pattern of the holes in the customer's flange is unknown. Transmission in the direction of the filling material is, however, ensured only if the transmission direction is variable and can be adjusted relative to the pattern of the holes in the flange.

According to one advantageous refinement of the apparatus according to the invention, the measurement signals are passed to the antenna from the signal production unit via a conductive element. The conductive element is, for example, a coaxial cable, a waveguide or a hollow conductor. It is also possible, of course, for the measurement signals to be fed directly into the antenna via a board with a microstripline.

The invention will be explained in more detail with reference to the following drawings, in which:

DETAILED DESCRIPTION

Figure 1:
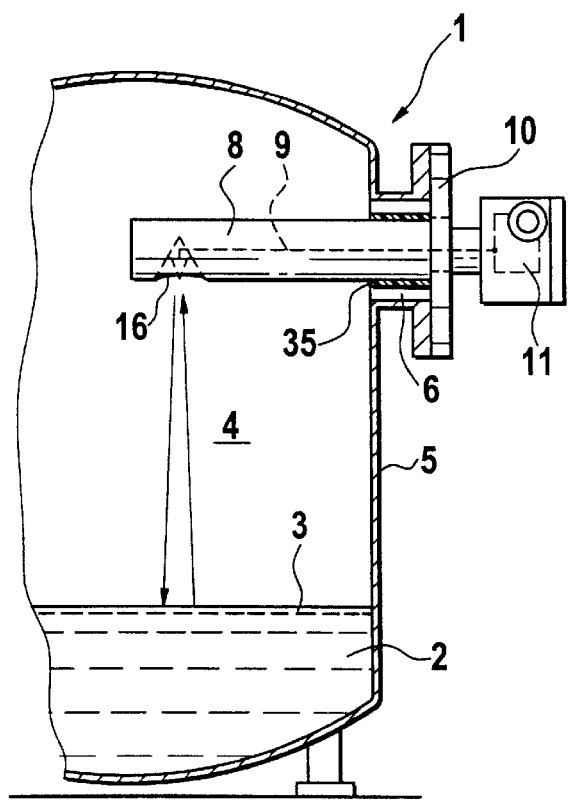
FIG. 1: shows an embodiment of the apparatus according to the invention, in which the measurement signals are fed in via a coaxial cable.
Figure 3A:
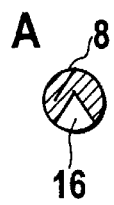
FIG. 3a: shows a cross section as denoted by A in FIG. 3, FIG. 4: shows an embodiment of the apparatus according to the invention in which the measurement signals are transmitted and received via a dielectric window.
Figure 3:
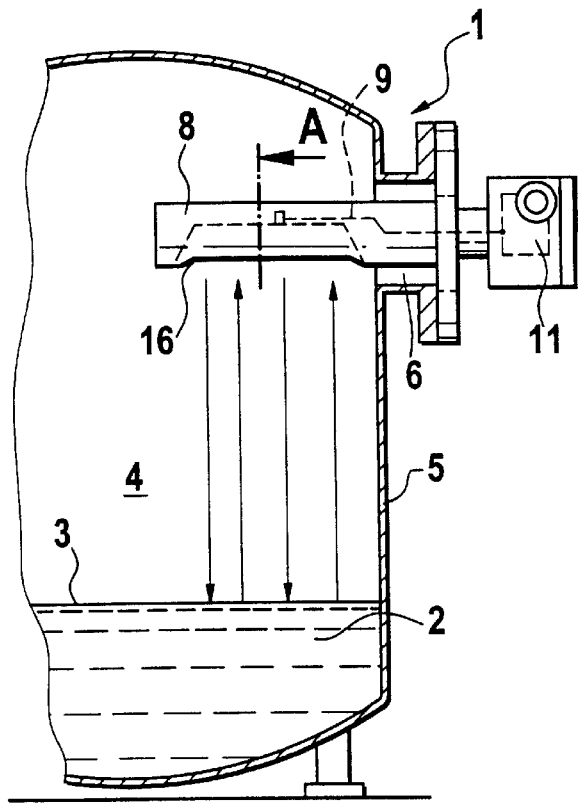
FIG. 3: shows an embodiment of the apparatus according to the invention having an asymmetric horn antenna.

FIG. 1 shows a first embodiment of the apparatus according to the invention. The antenna 7 is integrated in the elongated element 8. The external dimensions of the elongated element 8 are greater in the longitudinal direction and less in the transverse direction than the internal dimensions of the opening 6, which can be found in the upper region of the sidewall 5 of the container 4. Owing to the dimensioning of the elongated element 8, it is possible to pass the antenna 7 through the opening 6 into the interior of the container 4, and to place it such that the measurement signals strike the surface 3 of the filling material 2 essentially at right angles, and are reflected back into the antenna 7 in a corresponding way. The antenna 7, which transmits measurement signals in the direction of the surface 3 of the filling material 2 and receives the measurement signals reflected on the surface 3 of the filling material 2, is a symmetrical horn antenna 16 having a circular cross section. An asymmetric horn antenna is otherwise used in the embodiment shown in FIGS. 3 and 3a. In FIG. 1, the apparatus 1 according to the invention is in the form of a compact device, with the electronics section 11, that is to say the signal production unit and the control/evaluation unit, being located outside the container 4. Configuration as a compact device is, of course, not essential.

In order to avoid undesirable reflections of the measurement signals in the region of the opening 6, a metallic protection layer 35 is provided in the corresponding region of the elongated element 8. Comparable configurations have already become known in the context of a rod antenna from EP 0 834 722 A2. The keyword for embodiments of this type is: "inactive length".

Figure 2:
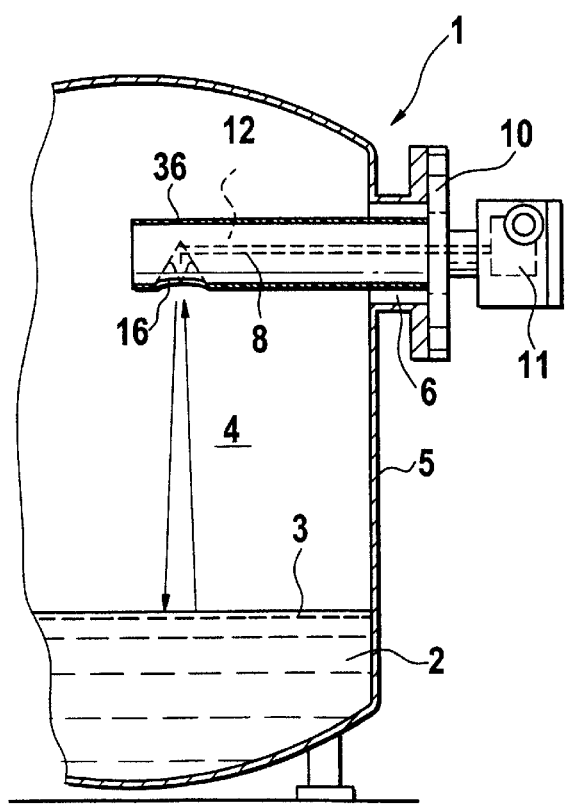
FIG. 2: shows an embodiment of the apparatus according to the invention, in which the measurement signals are fed in via a waveguide.

While, in the embodiment of the device 1 according to the invention shown in FIG. 1, the measurement signals are carried within the elongated element 8 via a coaxial cable 9, the measurement signals in the case of the configuration shown in FIG. 2 are carried via a hollow conductor 12. A waveguide may also be used. Furthermore, the measurement signals may also be fed directly into the horn antenna 16 via a microstripline arranged on a board.

In the embodiment shown in FIG. 2, the elongated element 8 also incidentally has a dielectric protection layer 36 drawn over it.

Figure 4:
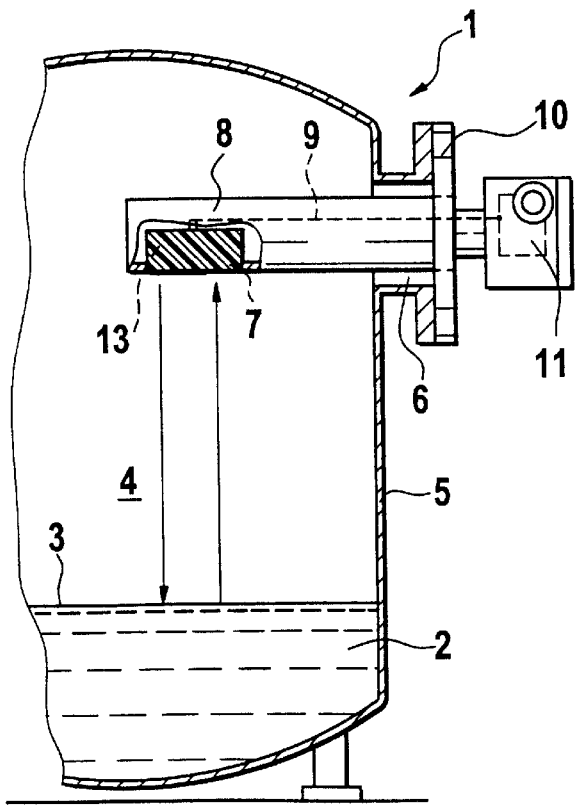

In the embodiment of the apparatus 1 according to the invention shown in FIG. 4, the elongated element 8 is made of a conductive material, in particular of a metal. The measurement device is thus distinguished by high resistance even to corrosive filling materials and vapors. If the elongated element 8 is made of a conductive material, the measurement signals are transmitted and received via a dielectric window 13 provided in the metallic sheath.

Figure 5:
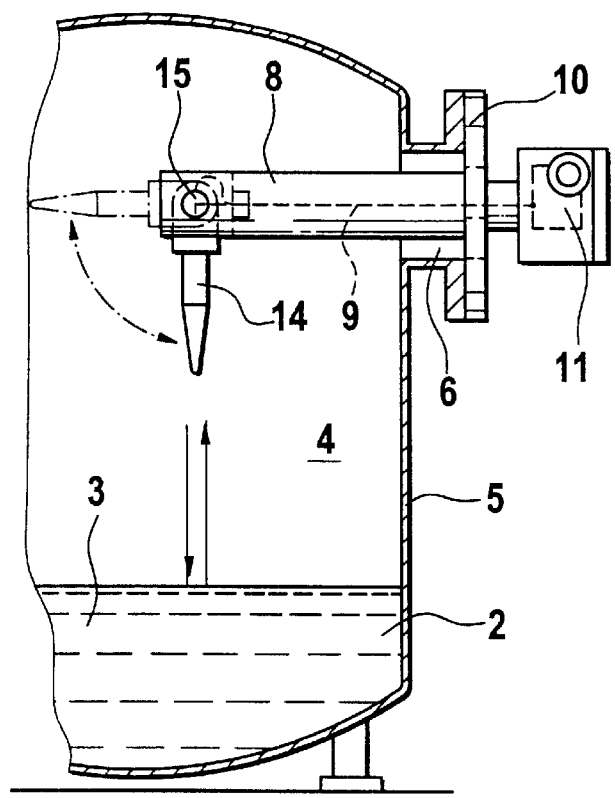
FIG. 5: shows an embodiment of the apparatus according to the invention having a rod antenna which can pivot.

In FIG. 5, the antenna is not—as shown in FIGS. 1 and 4—integrated in the elongated element 8. In fact, in this case, the measurement signals are transmitted and received via a rod antenna 14 which, in a first position, the installation position, is aligned in the longitudinal direction of the elongated element 8 and which, in a second position, the measurement position, is rotated through 90° by means of the pivoting mechanism 15, so that the measurement signals are now transmitted in the desired direction to the surface 3 of the filling material 2, and such that the measurement signals reflected on the surface 3 of the filling material 2 are received by the rod antenna 14.

Figure 6:
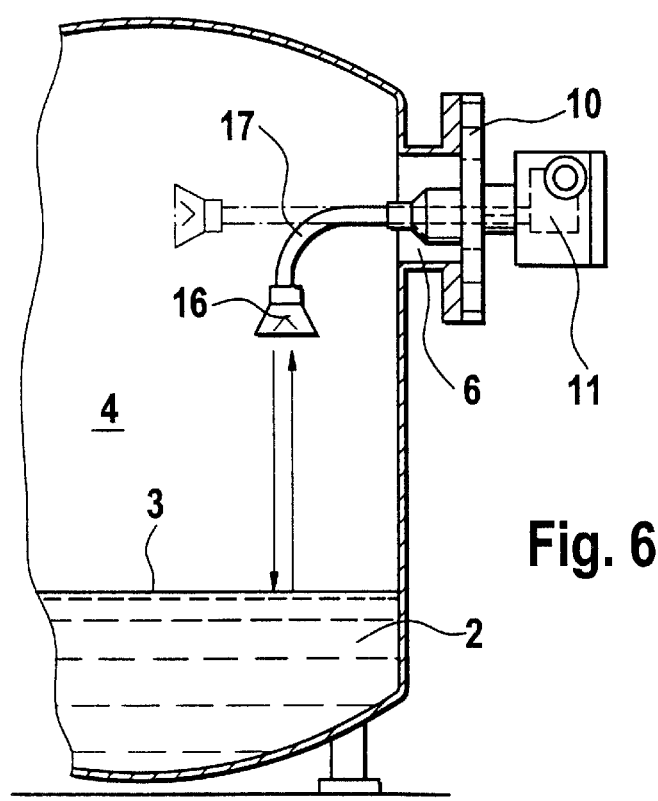
FIG. 6: shows an embodiment of the apparatus according to the invention having a horn antenna which is arranged such that it is flexible.

FIG. 6 shows a variant of the apparatus according to the invention. In this case, a horn antenna 16 is arranged in the end region of a flexible waveguide 17. In the installation position, the longitudinal axis of the horn antenna 16 virtually forms a continuation of the longitudinal axis of the elongated element 8 or of the flexible waveguide 17. Then, in the measurement position—as in the case described above—the horn antenna 16 is pivoted through 90°, so that the aperture of the horn antenna 16 is now aligned in the direction of the surface 3 of the filling material 2.

Figure 7:
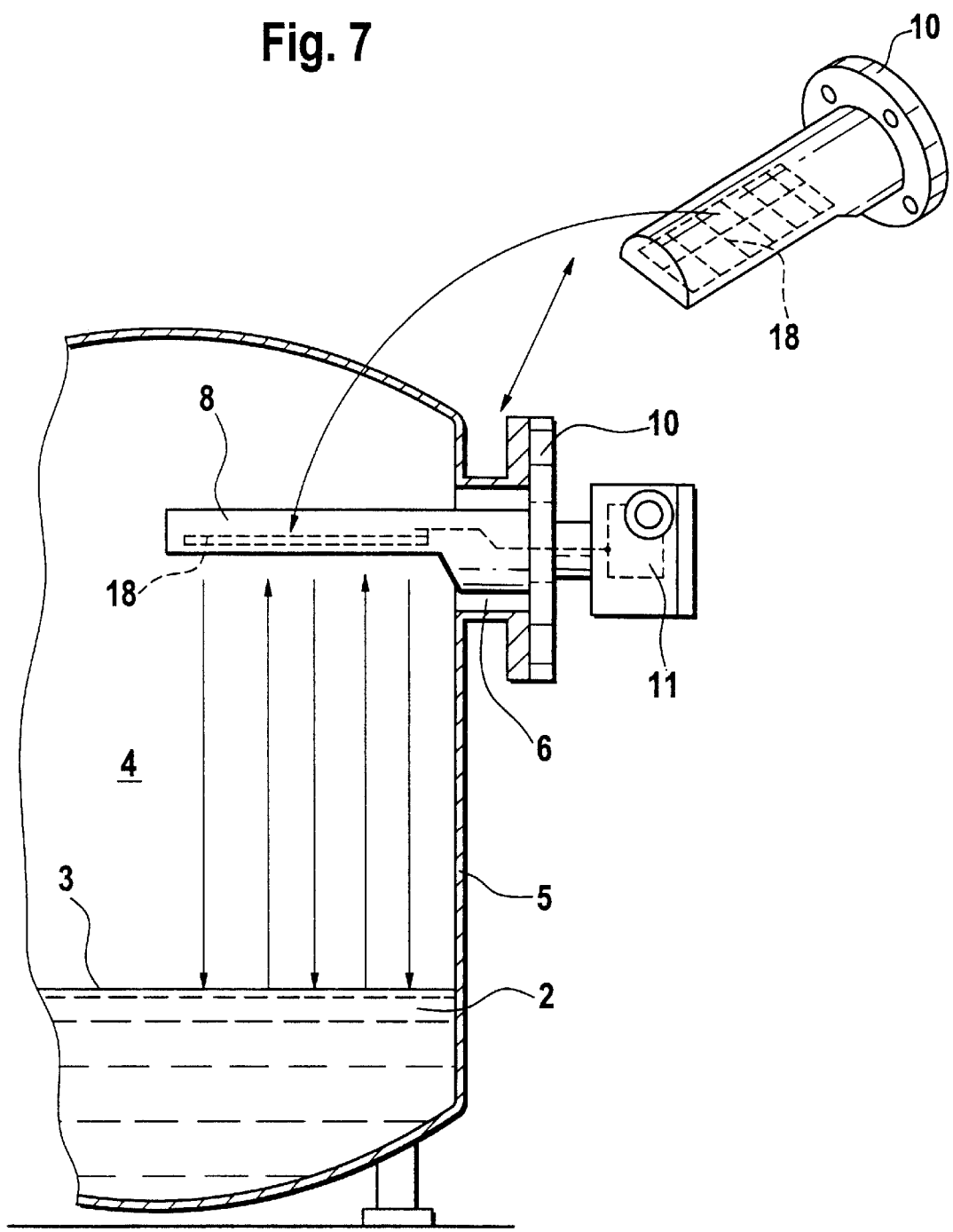
FIG. 7: shows an embodiment of the apparatus according to the invention in which a Yagi antenna is used as the antenna.
Figure 8:
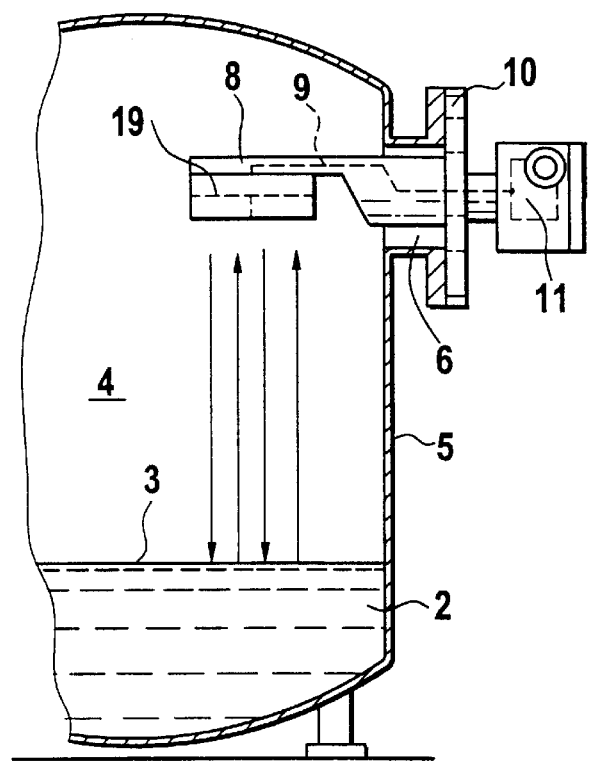
FIG. 8: shows an embodiment of the apparatus according to the invention in which a slotted waveguide antenna is used as the antenna.
Figure 9:
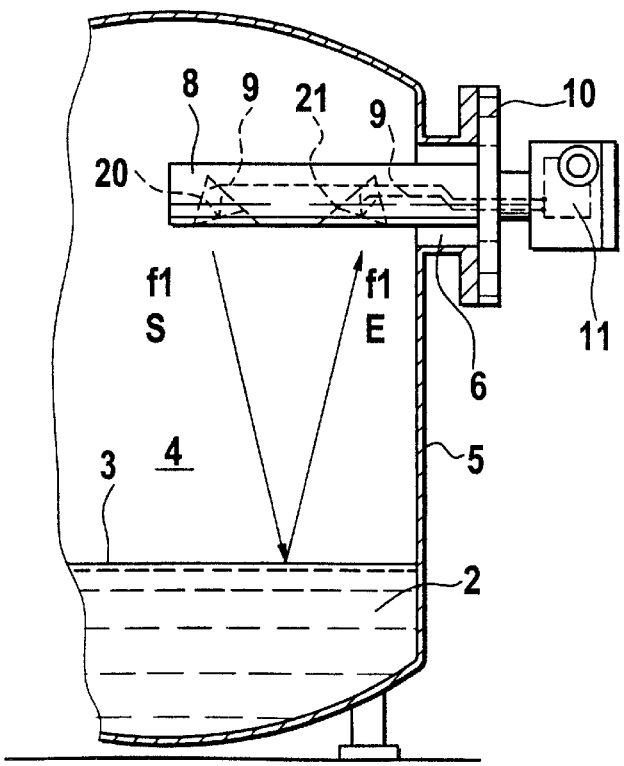
FIG. 9: shows an embodiment of the apparatus according to the invention having separate transmitting and receiving antennas.

FIG. 7 shows a further option for the configuration of the antenna 7. In this case, a so-called Yagi antenna 18 is used. A slotted waveguide antenna 19 is used in FIG. 8. FIG. 9 shows a refinement of the apparatus 1 according to the invention having a separate transmitting antenna 20 and receiving antenna 21. These and other antenna designs which can be used in conjunction with the present invention are described in the article "Advanced antenna design for communication modules", Second public Seminar, Ulm, Dec. 9, 1998 by L. Baggen, W. Simon, J. Borkes.

Figure 10:
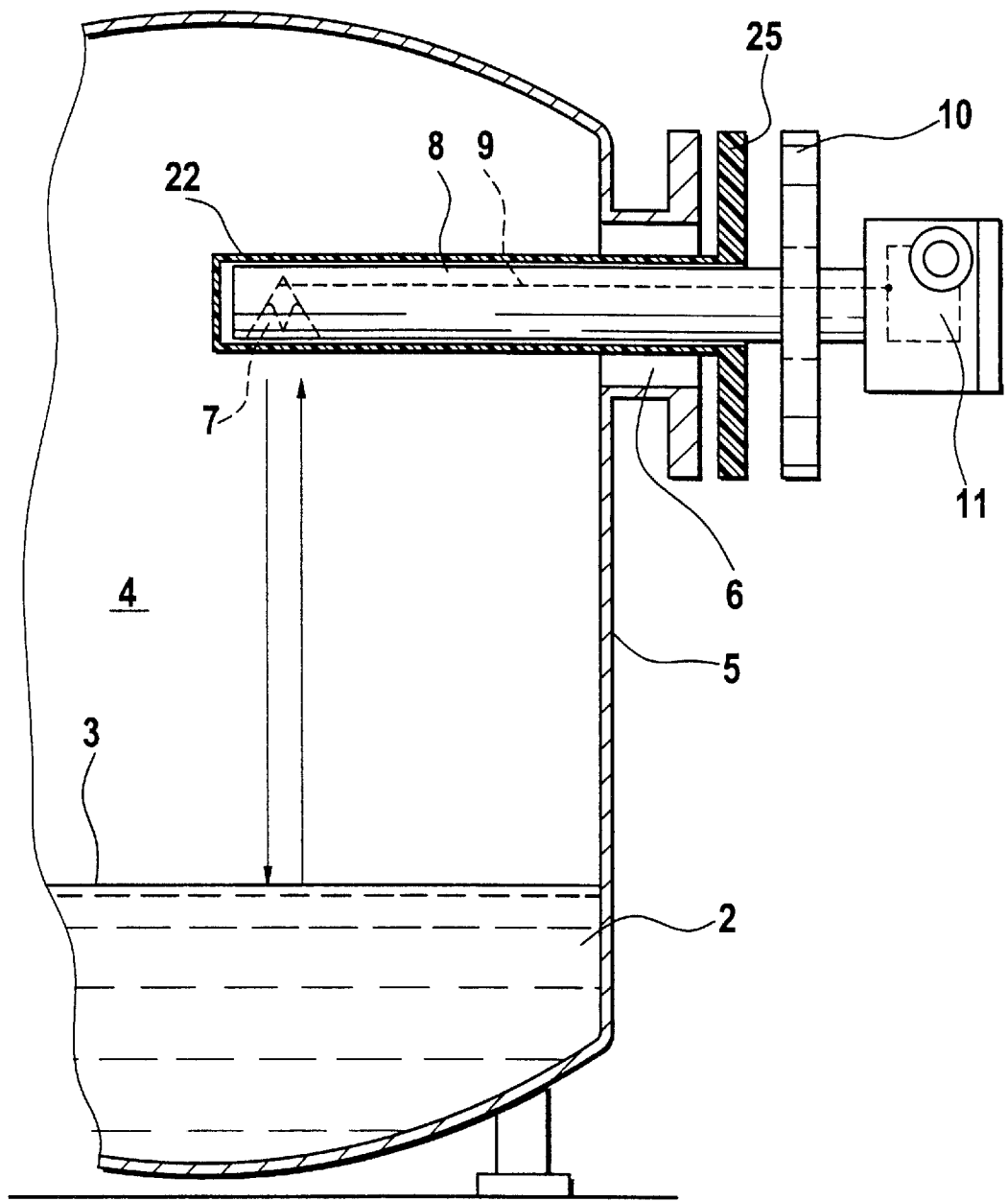
FIG. 10: shows an embodiment of the apparatus according to the invention having a dielectric protection tube.
Figure 11:
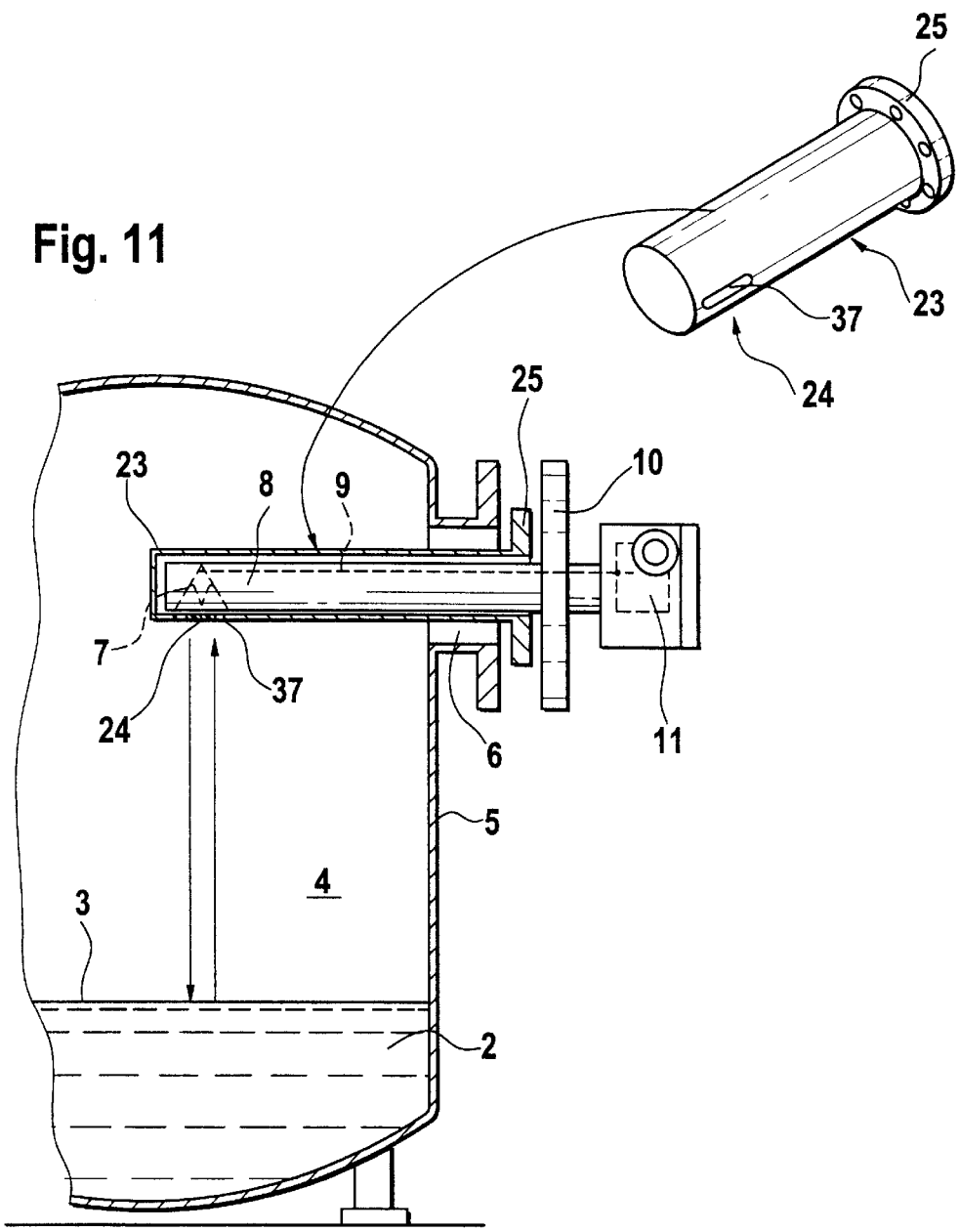
FIG. 11: shows an embodiment of the apparatus according to the invention having a metallic protection tube and a dielectric window.
Figure 12:
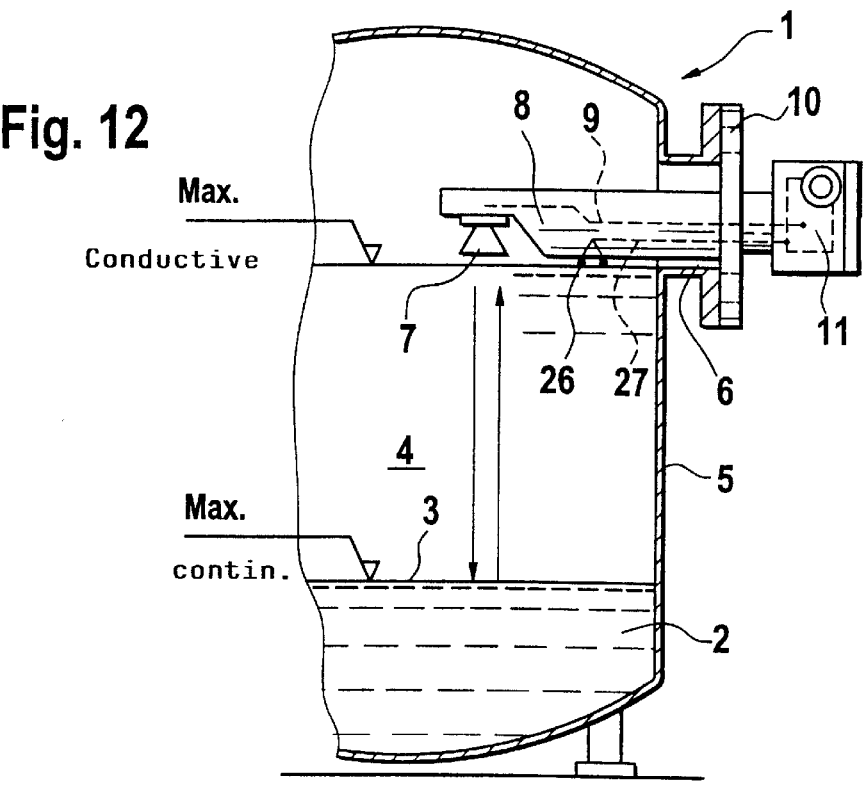
FIG. 12: shows an embodiment of the apparatus according to the invention having an additional conductive sensor.

One particularly advantageous embodiment of the apparatus 1 according to the invention is shown in FIG. 10. In this case, the elongated element 8 together with an integrated antenna 7 is arranged in a protection tube 22 composed of a dielectric material. The protection tube 22 is firmly mounted in the opening 6 via a flange 25. In order to install the elongated element 8 with the integrated antenna 7, this element is positioned in the protection tube 22 and is fixed on the connecting stub via the flange 10. Thus, in this configuration, the apparatus 1 according to the invention can be fitted and removed, for example for maintenance purposes, even when the filling material 2 in the container 4 extends to above the opening 6. If the container 4 contains a corrosive filling material 2, then it is advantageous to replace the dielectric protection tube 22 by a metallic protection tube 23 or by a metallic sleeve. This configuration is shown in detail in FIG. 11. A cutout 37, into which a dielectric material 24 is inserted, is provided in the protection tube 23 in order that the measurement signals can pass through the metallic protection tube 23.

Figure 13:
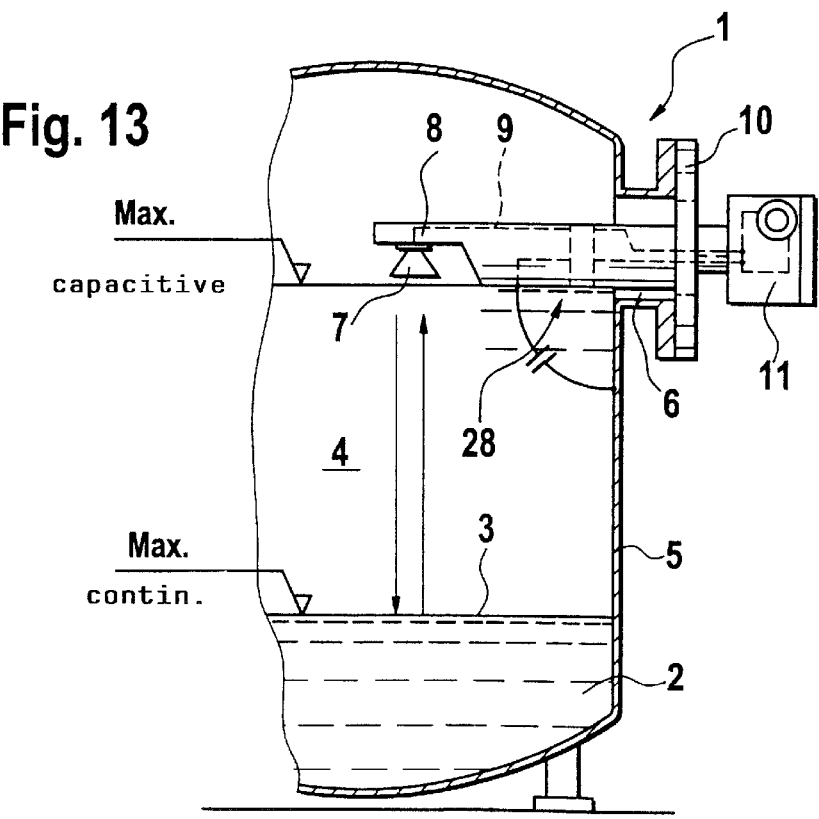
FIG. 13: shows an embodiment of the apparatus according to the invention having an additional capacitive sensor.
Figure 14:
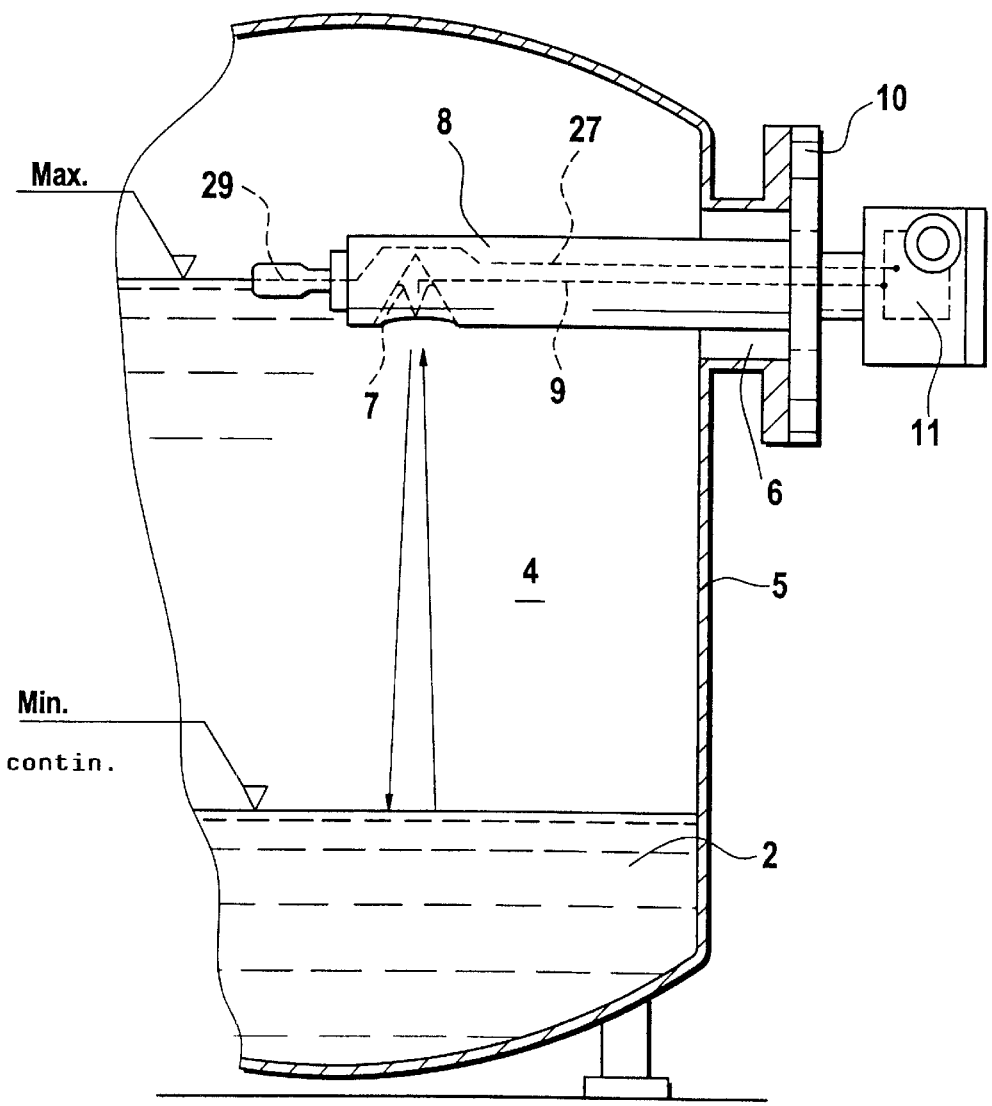
FIG. 14: shows an embodiment of the apparatus according to the invention having an additional vibration detector.
Figure 15:
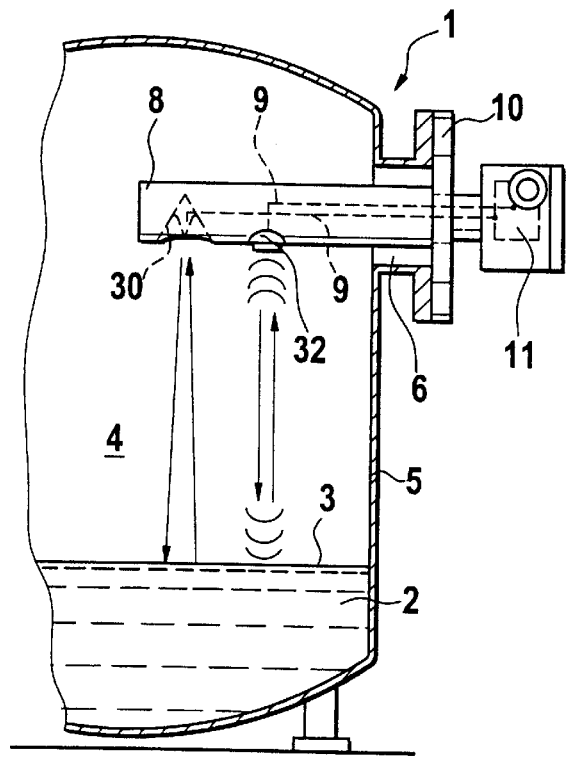
FIG. 15: shows an embodiment of the apparatus according to the invention having an additional ultrasound sensor.
Figure 16:
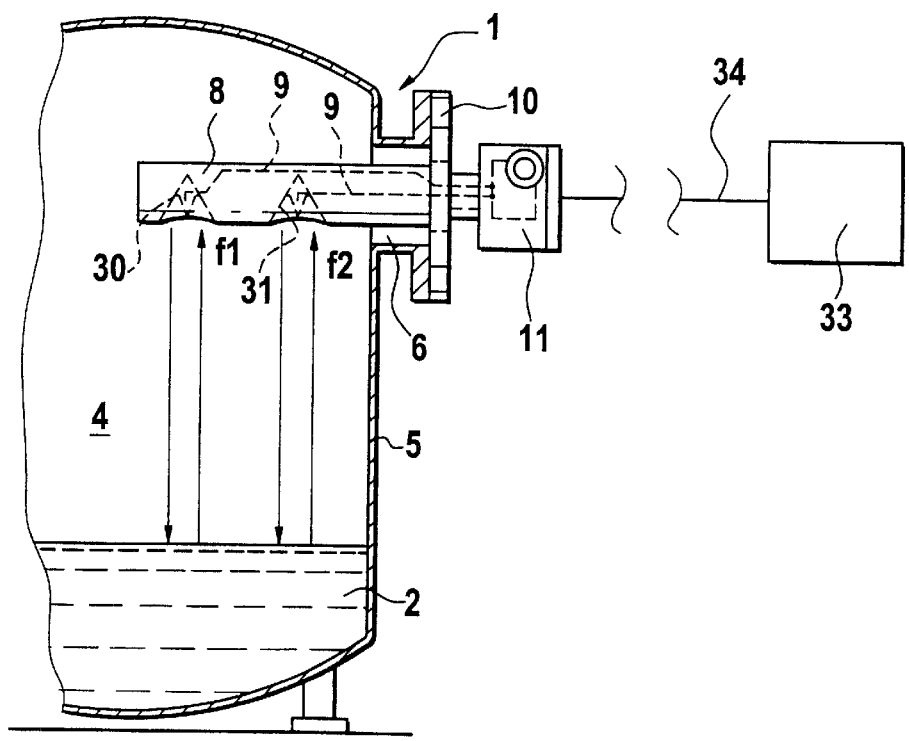
FIG. 16: shows an embodiment of the apparatus according to the invention having two delay-time sensors, which operate with measurement signals at different frequencies.

FIGS. 12 to 16 show refinements of the apparatus 1 according to the invention in which an additional sensor for determining and/or monitoring the filling level is also provided on the preferably elongated element 8. For limit filling level measurement and monitoring, the additional sensor is, for example, a conductive sensor 26 (FIG. 12), a capacitor sensor 28 (FIG. 13) or a vibration detector (FIG. 13). If it is intended to use a further sensor for continuous filling level measurement or filling level monitoring as well, for example for the purpose of plausibility checks, then this sensor may be either an ultrasound sensor 32 (FIG. 15) or a second microwave sensor 31 (FIG. 16) which operates using measurement signals at a measurement frequency f2, which is different to the measurement frequency f1 of the first microwave sensor 30. Apart from this, FIG. 16 also shows the refinement of the apparatus 1 according to the invention in which the sensor 1 communicates with a remote monitoring point 33 via a bus line 34. As already mentioned at a previous point, communication may be based on any known transmission standard.

List of Reference Symbols

1 Apparatus according to the invention
2 Filling material
3 Surface of the filling material
4 Container
5 Sidewall
6 Opening/connecting stub
7 Antenna
8 Elongated element
9 Coaxial cable
10 Flange
11 Electronics section
12 Waveguide
13 Dielectric window
14 Rod antenna
15 Pivoting mechanism
16 Horn antenna
17 Flexible waveguide
18 Yagi antenna
19 Slotted waveguide antenna
20 Transmitting antenna
21 Receiving antenna
22 Dielectric protection tube
23 Metallic protection tube
24 Dielectric material
25 Flange
26 Conductive sensor
27 Cable
28 Capacitive sensor
29 Vibration detector
30 First microwave sensor
31 Second microwave sensor
32 Ultrasound sensor
33 Monitoring point
34 Bus line
35 Dielectric protection layer
36 Metallic protection layer
37 Cutout

What is claimed is:

1. An apparatus for determining the filling level of a filling material in a container, the container having a sidewall and an opening in the upper region of the sidewall, the filling material defining a surface in the container, comprising:
    a signal production unit which generates measurement signals;
    an elongated element positioned in said opening and extending into the container;
    at least one antenna mounted to said elongated element, which transmits the measurement signals in the direction of the surface of the filling material and receives the measurement signals reflected from the surface of the filling material; and
    a control/evaluation unit which uses the delay time of the measurement signals to determine the filling level of the filling material in the container, wherein:
        said at least one antenna is positioned relative to said elongated element, and arranged and configured such that the measurement signals are emitted essentially in the direction of the surface of the filling material, and such that the measurement signals reflected from the surface of the filling material are received by said at least one antenna.

2. The apparatus as defined in claim 1, wherein said elongated element has external dimensions which in the longitudinal direction are greater, and in the transverse direction are less, than the internal dimensions of said opening.

3. The apparatus as defined in claim 1, further comprising:
    a metallic shield arranged in said opening.

4. The apparatus as defined in claim 1, further comprising:
    a metallic shield provided in said at least one antenna region and arranged in the immediate vicinity of said opening.

5. The apparatus as defined in claim 1, wherein said sensor and/or said at least one antenna is provided with a dielectric protective layer, at least in the region which projects into the interior of the container.

6. The apparatus as defined in claim 1, wherein said sensor and/or said at least one antenna is provided with a metallic protective layer with a dielectric window in the region of said at least one antenna, at least in the region which projects into the interior of the container.

7. The apparatus as defined in claim 1, further comprising:
    an outer housing mounted in said opening, and wherein said at least one antenna is arranged in said outer housing.

8. The apparatus as defined in claim 7, wherein said outer housing is made of a dielectric material.

9. The apparatus as defined in claim 7, wherein said outer housing is made of a conductive material which has a cutout on the side facing the filling material.

10. The apparatus as defined in claim 9, further comprising:
    a dielectric insert provided in said cutout.

11. The apparatus as defined in claim 1, further comprising:
    an outer housing mounted in said opening, and wherein said at least one antenna and said sensor are arranged in said outer housing.

12. The apparatus as defined in claim 11, wherein said outer housing is made of a dielectric material.

13. The apparatus as defined in claim 11, wherein said outer housing is made of a conductive material which has a cutout on the side facing the filling material.

14. The apparatus as defined in claim 13, further comprising:
a dielectric insert provided in said cutout.

15. The apparatus as defined in claim 11, wherein said at least one antenna is arranged such that it can rotate or can pivot about its longitudinal axis in said outer housing.

16. The apparatus as defined in claim 1, further comprising:
a conductive element, wherein said conductive element is provided in said at least one antenna, and wherein the measurement signals are passed via said conductive element.

17. The apparatus as defined in claim 16, wherein said conductive element is one of: a coaxial cable, a waveguide and a hollow conductor.

18. The apparatus as defined in claim 1, wherein said transmission unit and said reception unit are separate units.

19. The apparatus as defined in claim 1, wherein:
said at least one antenna is mounted to the container to extend through said opening into the container above the surface of the filling material in the container.

20. The apparatus as defined in claim 1, further comprising:
an outer housing mounted in said opening, and wherein said elongated element is arranged in said outer housing.

21. An apparatus for determining the filling level of a filling material in a container, the filling material defining a surface in the container, comprising:
a signal production unit which generates measurement signals;
at least one antenna which transmits the measurement signals in the direction of the surface of the filling material and receives the measurement signals reflected from the surface of the filling material;
a control/evaluation unit which uses the delay time of the measurement signals to determine the filling level of the filling material in the container; and
a sensor which determines at least one process variable in the container, wherein:
an opening is provided in the upper region of one sidewall of the container;
said at least one antenna is positioned relative to said opening, and arranged and configured such that the measurement signals are emitted essentially in the direction of the surface of the filling material, and such that the measurement signals reflected from the surface of the filling material are received by said at least one antenna; and
said sensor is connected to said at least one antenna.

22. An apparatus for determining the filling level of a filling material in a container, the filling material defining a surface in the container, comprising:
a signal production unit which generates measurement signals;
at least one antenna which transmits the measurement signals in the direction of the surface of the filling material and receives the measurement signals reflected from the surface of the filling material; and
a control/evaluation unit which uses the delay time of the measurement signals to determine the filling level of the filling material in the container, wherein:
an opening is provided in the upper region of one sidewall of the container;
said at least one antenna is positioned relative to said opening, and arranged and configured such that the measurement signals are emitted essentially in the direction of the surface of the filling material, and such that the measurement signals reflected from the surface of the filling material are received by said at least one antenna;
said at least one antenna is integrated into an elongated element, the external dimensions of which in the longitudinal direction are greater, and in the transverse direction are less, than the internal dimensions of said opening; and
said at least one antenna is one of: a leaky waveguide, a ridge waveguide, a Yagi antenna, a horn antenna, any one with a symmetrical, or asymmetrical aperture, a rod antenna, and a horn antenna which are preferably arranged such that they can be folded in the region of the end face of said elongated element.

* * * * *